(12) United States Patent
Morici

(10) Patent No.: US 10,056,828 B2
(45) Date of Patent: Aug. 21, 2018

(54) SYSTEM AND METHOD FOR CONTROLLING CURRENT IN A SWITCHING REGULATOR

(71) Applicant: Infineon Technologies Austria AG, Villach (AT)

(72) Inventor: Andrea Morici, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/206,940

(22) Filed: Jul. 11, 2016

(65) Prior Publication Data

US 2018/0013344 A1    Jan. 11, 2018

(51) Int. Cl.
  *H02M 3/156*   (2006.01)
  *H02M 1/08*    (2006.01)
  *H02M 1/00*    (2006.01)

(52) U.S. Cl.
  CPC ............. *H02M 3/156* (2013.01); *H02M 1/08* (2013.01); *H02M 2001/0009* (2013.01)

(58) Field of Classification Search
  CPC . H02M 3/156; H02M 1/08; H02M 2001/0009
  USPC ................. 323/271, 274, 275, 277, 282–285
  See application file for complete search history.

(56) References Cited

U.S. PATENT DOCUMENTS

| | | | | |
|---|---|---|---|---|
| 5,568,044 A * | 10/1996 | Bittner | ................... | H02M 3/156 323/224 |
| 6,894,471 B2 * | 5/2005 | Corva | ................... | H02M 3/156 323/282 |
| 6,979,987 B2 * | 12/2005 | Kernahan | ............. | H02M 3/157 323/283 |
| 7,719,248 B1 * | 5/2010 | Melanson | ........... | H02M 1/4225 323/222 |
| 7,759,881 B1 * | 7/2010 | Melanson | .......... | H05B 33/0815 315/224 |
| 8,059,018 B2 * | 11/2011 | Latham | ................. | H03M 3/344 340/540 |
| 8,179,110 B2 * | 5/2012 | Melanson | .......... | H05B 33/0815 323/282 |
| 8,487,546 B2 * | 7/2013 | Melanson | .......... | H05B 33/0815 315/291 |

(Continued)

OTHER PUBLICATIONS

A. Chibani and M. Nakaoka, "A New Control Topology of Single-stage HF link Switch-Mode-Rectifier with Sinusoidal Line Current", IEEE, 1990, pp. 1157-1162.*

(Continued)

*Primary Examiner* — Timothy J Dole
*Assistant Examiner* — Htet Z Kyaw
(74) *Attorney, Agent, or Firm* — Slater Matsil, LLP

(57) ABSTRACT

In accordance with an embodiment, a method of operating a switch-mode power supply includes receiving a measurement of a first current of the switch-mode power supply, determining a ripple of the first current based on the received measurement of the first current, determining a maximum current threshold based on a target average current and the determined ripple of the first current, determining an off time of a switch based on a target current ripple and the determined ripple of the first current, turning off the switch when the first current reaches the maximum current threshold, and turning on the switch after the determined off time has elapsed after turning off the switch.

23 Claims, 14 Drawing Sheets

(56) References Cited

U.S. PATENT DOCUMENTS

| | | | | |
|---|---|---|---|---|
| 8,638,076 B2* | 1/2014 | Young | ............... | H02M 3/156 323/282 |
| 8,901,908 B2* | 12/2014 | Tang | ............... | H02M 3/157 323/283 |
| 8,933,647 B2* | 1/2015 | Lischka | ............ | H05B 33/0818 315/193 |
| 9,401,649 B2* | 7/2016 | Sasaki | ............... | H05B 33/0815 |
| 9,444,332 B2* | 9/2016 | Bizjak | ............... | H02M 3/156 |
| 9,887,624 B2* | 2/2018 | Hofmann | ............ | H02M 3/156 |
| 2004/0095117 A1* | 5/2004 | Kernahan | ............ | H02M 3/157 323/282 |
| 2005/0162142 A1* | 7/2005 | Kernahan | ............ | H02M 3/157 323/283 |
| 2006/0015274 A1* | 1/2006 | Trandafir | ............ | H02M 3/157 702/64 |
| 2006/0261754 A1* | 11/2006 | Lee | ............... | H05B 33/0815 315/291 |
| 2007/0024213 A1* | 2/2007 | Shteynberg | ........ | H05B 33/0815 315/291 |
| 2007/0024228 A1* | 2/2007 | Fujinaka | ............... | H02P 8/18 318/696 |
| 2008/0043504 A1* | 2/2008 | Ye | ............... | H02M 3/33507 363/97 |
| 2008/0006799 A1 | 3/2008 | Coleman | | |
| 2009/0189580 A1 | 7/2009 | Akahane et al. | | |
| 2011/0089915 A1 | 4/2011 | Qiu et al. | | |
| 2012/0014148 A1* | 1/2012 | Li | ............... | H02M 1/4216 363/78 |
| 2012/0078556 A1* | 3/2012 | Holmberg | ............ | H02M 3/156 702/64 |
| 2012/0112695 A1* | 5/2012 | Nishi | ............... | B60L 3/0046 320/109 |
| 2012/0112721 A1 | 5/2012 | Wu et al. | | |
| 2012/0119666 A1* | 5/2012 | Adamowicz | ........ | H05B 41/2928 315/224 |
| 2014/0327421 A1 | 11/2014 | Arao | | |
| 2014/0354257 A1 | 12/2014 | Paul et al. | | |
| 2015/0366010 A1* | 12/2015 | Mao | ............... | H05B 33/0815 315/223 |
| 2016/0036324 A1 | 2/2016 | Hofmann et al. | | |
| 2016/0181918 A1* | 6/2016 | Herfurth | ............... | H02M 1/08 315/291 |
| 2016/0233766 A1* | 8/2016 | Todorov | ............ | H02M 3/1584 |

OTHER PUBLICATIONS

Received STIC search report from EIC 2800 searcher Benjamin Martin dated Apr. 7, 2017.*

Received STIC search report from EIC 2800 searcher Samir Patel dated Jul. 13, 2017.*

Infineon, "Digital DC/DC Buck Controller IC, Power Management & Multimarket" ILD2111, Datasheet Revision 1.0, Apr. 8, 2015, pp. 1-66.

Linear Technology, "40Vin LED Converter with Internal PWM Generator," LT3954, www.linear.com/3954, LT 0615 Rev. A, 2013, pp. 1-26.

Texas Instruments, "AN-1487 Current Mode Hysteretic Buck Regulators," Application Report, SNVA170B-May 2006, Revised May 2013, pp. 11.

* cited by examiner

SYSTEM AND METHOD FOR CONTROLLING CURRENT IN A SWITCHING REGULATOR

TECHNICAL FIELD

The present invention relates generally to an electronic device, and, particularly to a system and method for controlling a current in a switching regulator.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switch-mode power supply (SMPS). An SMPS is usually more efficient than other types of power conversion systems because power conversion is performed by controlled charging and discharging of the inductor or transformer and reduces energy lost due to power dissipation caused by resistive voltage drops.

Specific topologies for SMPS comprise buck-boost converters and flyback converters, among others. A buck-boost converter typically makes use of an inductor whereas a flyback converter isolates a load and may multiply the voltage conversion ratio through the use of a transformer. In addition to the energy storage element (either inductor or transformer), the operation of the switch is of particular importance, especially in high voltage applications.

A power supply can be designed to regulate current instead of voltage. Current controlled power supply systems may be used in electronic applications that are particularly susceptible to current and current variations, such as those related to light emitting diodes, (LEDs).

SUMMARY

In accordance with an embodiment, a method of operating a switch-mode power supply includes receiving a measurement of a first current of the switch-mode power supply, determining a ripple of the first current based on the received measurement of the first current, determining a maximum current threshold based on a target average current and the determined ripple of the first current, determining an off time of a switch based on a target current ripple and the determined ripple of the first current, turning off the switch when the first current reaches the maximum current threshold, and turning on the switch after the determined off time has elapsed after turning off the switch.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
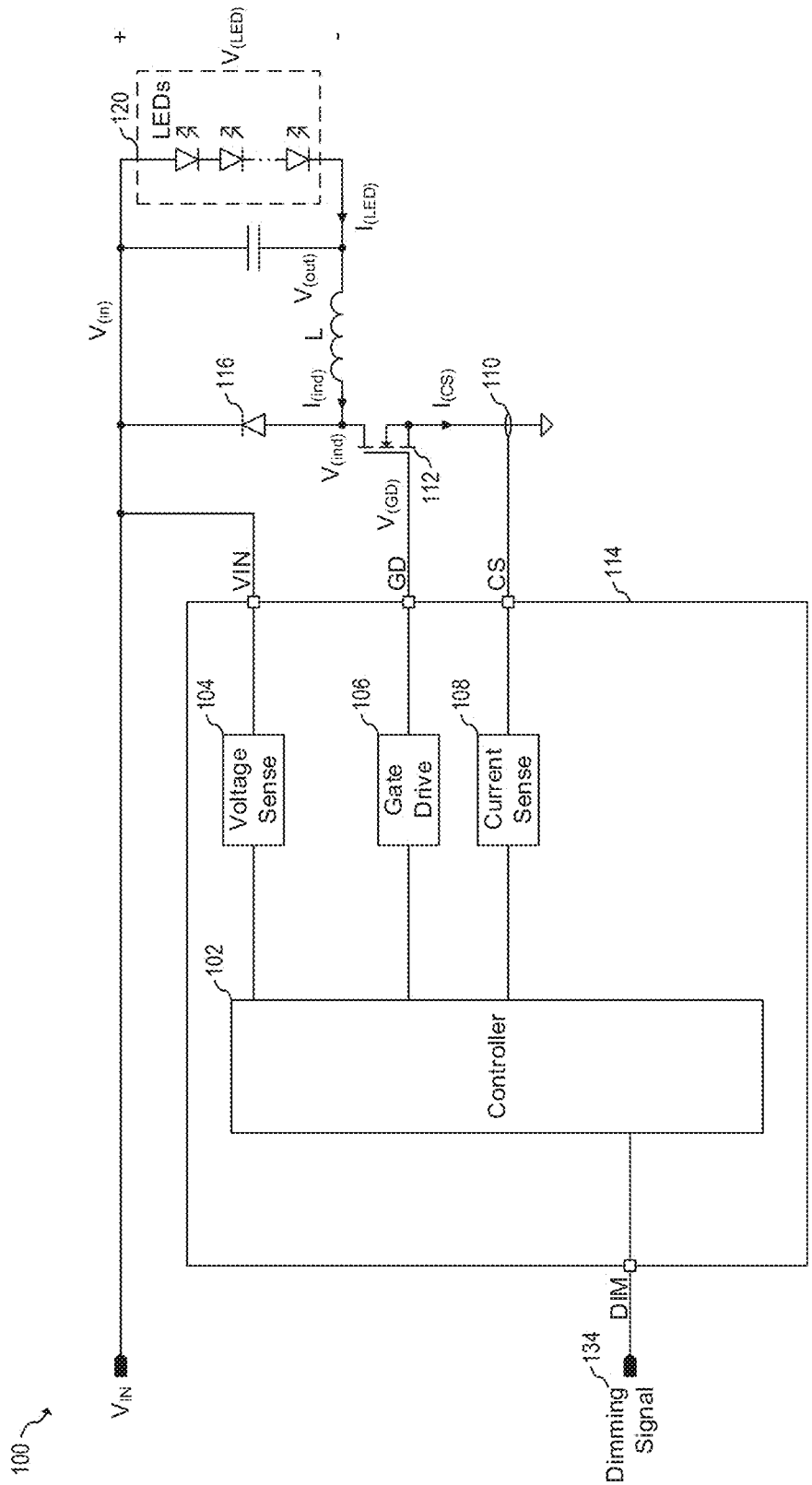
FIG. 1 illustrates an LED lighting system according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for controlling a current in a switch-mode converter of the buck topology for light emitting diode (LED) applications. Embodiments of the present invention may also be applied to various loads and various systems that utilize current-controlled mechanisms, such as, for example, a current-controlled solenoid driver or other current-controlled switch-mode power supply topologies.

The use of LEDs in digital displays and modern electronics is well known. An LED is a type of diode that converts a forward current into light. The light emitted by an LED is proportional to the forward current in the LED, with a maximum rated average (DC) forward current corresponding to maximum luminosity. Controlling the average forward current in the LED, thus, controls the luminosity of the LED. Discontinuities or abrupt changes in the forward current of the LED may be visible in the emitted light, impacting parameters of interest, such as flicker (light-dark oscillation of a light source) and shimmer (variation of light output from a light source). Therefore, controlling the generated current behavior may have an impact on such parameters. The LED device itself may have limited current handing capabilities. Thus, controlling the current behavior may further include limiting the current of the LED to be within its rated current.

There are multiple considerations in the design of LED controllers. Among the most relevant considerations are: controlling the average inductor current, controlling the current ripple, controlling the switching frequency, and keeping the system complexity low. The current during soft-start and steady-state may be controlled such that it does not show discontinuities or abrupt changes while exhibiting a fast convergence time to a target average inductor current. The current ripple may be kept small to minimize impact in the LED life time. The switching frequency may be kept higher than a minimum value as to, for example, avoid audible noise, and to allow for the use of smaller inductors or transformers, and to minimize current ripple. The switching frequency, however, may be kept lower than a maximum value as, for example, to reduce switching losses. Reducing the system complexity is often desirable because it generally reduces development costs, time to market and product costs. For example, there is demand for reducing the system's pin count, as well as the PCB footprint and number of required components.

The design process of an LED controller often involves trade-offs between different considerations. For example, LED controllers often generate a current ripple that, in addition to any potential visible effect, may have reliability implications as the current may instantaneously be above the LED's maximum peak current. Reducing the current ripple often comes at the expense of higher complexity and higher convergence time towards a target average inductor current.

In embodiments of the present invention, regulation of the current ripple and maximum peak current allowed is done concurrently and synchronously, resulting in a fast convergence time towards a target average inductor current while exhibiting minimal discontinuities.

FIG. 1 illustrates an LED lighting system 100 according to an embodiment of the present invention. Essentially, system 100 includes a switch-mode buck converter including power supply integrated circuit (IC) 114 that supplies current to LED load 120 that includes one or more LED devices. LED lighting system 100 includes controller 102, gate drive block 106, current sense block 108, voltage sense block 104, transistor 112, current sensor 110, inductor L, diode 116, and LED load 120. In this embodiment, controller 102, voltage sense block 104, gate drive block 106, and current sense block 108 are inside integrated circuit (IC) 114. In other embodiments, a different set of components may be integrated inside IC 114. Any of the components may be integrated in IC 114, such as diode 116 and transistor 112. Similarly, any of the components may be implemented external to IC 114. A fully discrete implementation is also possible.

Controller 102 may be capable, for example, of performing mathematical operations, as well interacting with external components. Controller 102 may be custom designed, or, alternatively, may be a general purpose controller, a processor, or any similar component known in the art.

Gate drive block 106 is a circuit coupled to a gate terminal of transistor 112 that is capable of applying voltage $V_{(GD)}$ to turn transistor 112 on or off depending on voltage $V_{(GD)}$ value. Gate drive block 106 may be integrated inside IC circuit 114 or, alternatively, may be a component external to IC 114.

Current sense block 108 and current sensor 110 together are capable of sensing or measuring a current. Current sensor 110 may include a resistor, coupled in series with transistor 112 load path, used to sense a voltage created by current $I_{(CS)}$ flowing across it. Current sense block 108 may include an analog-to-digital (ADC) converter to sample the voltage created by current $I_{(CS)}$ flowing across the resistor. Alternatively, current sense block 108 and current sensor 110 may be implemented using analog, digital, or mixed signal techniques known in the art. The ADC block, if needed, may be inside IC 114 or alternatively, may be a component external to IC 114.

Voltage sense block 104 is capable of sensing or measuring input voltage $V_{(in)}$. Input voltage $V_{(in)}$ may be used to determine some parameter important to the operation of some embodiments of the present invention. Voltage sense block 104 may include a dedicated ADC, may share the ADC with other blocks, such as with current sense block 108, or may be implemented using analog, digital, or mixed signal techniques known in the art. The ADC block, if needed, may be inside IC 114 or alternatively, may be a component external to IC 114. In some embodiments, input voltage $V_{(in)}$ is not sensed and, instead, may be estimated. For example, when input voltage $V_{(in)}$ is given by a power supply with a fixed voltage, sensing input voltage $V_{(in)}$ may not be necessary. Output voltage V(out) may not be sensed and, instead, may be estimated, for example, by subtracting load voltage $V_{(LED)}$ from input voltage $V_{(in)}$. In other embodiments, output voltage $V_{(out)}$ may be sensed or measured directly.

A description of the general operation of LED lighting system 100 is as follows. When transistor 112 is on, voltage $V_{(ind)}$ is pulled down. Since voltage $V_{(out)}$ is pulled up by voltage $V_{(in)}$ through LED load 120, current $I_{(ind)}$ increases according to a voltage difference given by $V_{(out)}-V_{(ind)}$. Current sensor 110 monitors current $I_{(CS)}$, which is approximately equal to current $I_{(ind)}$ while transistor 112 is on. In some embodiments, controller 102 is configured to turn off transistor 112 based on current $I_{(CS)}$. When transistor 112 is turned off, current $I_{(ind)}$ causes voltage $V_{(ind)}$ to increase to voltage $V_{(in)}+V_{(D)}$, where $V_{(D)}$ is the forward voltage of diode 116. At that point, current $I_{(ind)}$ flows through diode 116 until inductor current $I_{(ind)}$ reaches zero or transistor 112 is turned on again. Turning on transistor 112 again causes the process to repeat. The process for turning on and off transistor 112 may be done by PWM techniques, PFM techniques, or any other method known in the art. Voltage $V_{(in)}$ may be sensed to determine voltage $V_{(out)}$ since a voltage drop associated with LED load 120 is approximately constant.

Dimming signal 134 establishes a desired average amplitude for current $I_{(LED)}$, thus, controlling the brightness of LED load 120. In some embodiments, dimming signal 134 is a PWM signal. Alternatively, dimming signal 134 may operate in accordance with a digital communication protocol such as I²S, I²C, PCM, UART, MIPI/RFFE, DALI, KNX, or any other serial or parallel interface. Other embodiments may use analog dimming to control the brightness of LED load 120. For example, a mapping where 0 V represents LED load 120 is off and 10 V represents LED load 120 is at full brightness could be used. A range between 1 V to 10 V could also be used. Other dimming protocols or techniques known in the art could also be used. Controller 102 may, for example, adjust the duty cycle of a PWM signal driven by gate drive block 106 in order to increase or decrease the average inductor current supplied to LED load 120. Alternatively, the dimming signal may affect the frequency of a signal driven by gate drive block 106, the skipping of pulses of a signal driven by gate drive block 106, or any other parameter affecting LED load 120 light intensity. By this approach, controller 102 can regulate current $I_{(ind)}$ to a target average value $I_{(targetAvg)}$ given by dimming signal 134.

In some embodiments, LED lighting system 100 may start operation, stop operation, or change behavior based on an external signal (not shown), a pre-loaded set of instructions, factory defaults, or any other method known in the art.

Transistor 112 may be a normally-off, n-type transistor. In further embodiments of the present invention, transistor 112 may be implemented using transistors of the n-type or p-type including, but not limited to, metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs). Alternatively, other transistor types may be used. The selection of which transistor to use may be made according to the specifications and voltage levels of the particular power converter being designed and appropriate adjustments to the circuit may be made to accommodate the particular device type. Transistor 112 may be inside IC 114 or, alternatively, may be a component external to IC 114.

Figure 2:
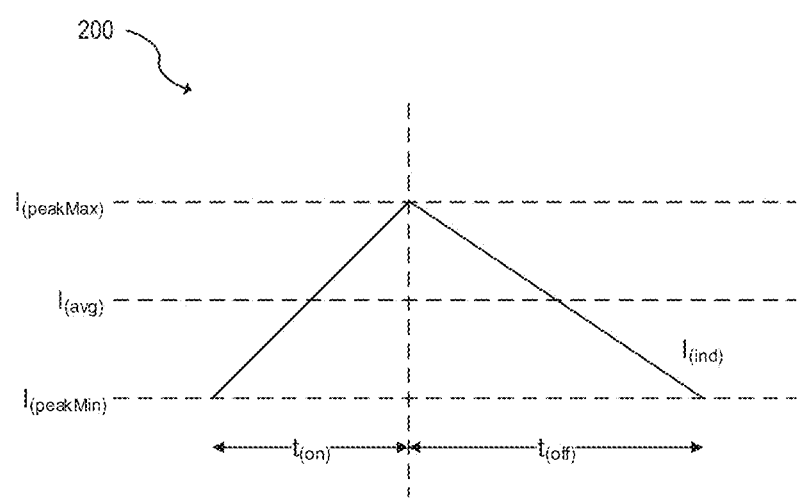
FIG. 2 shows an example current waveform of a typical inductor current $I_{(ind)}$ of an embodiment of the present invention during a turn-on/turn-off cycle.

FIG. 2 shows example current waveform 200 of an inductor current $I_{(ind)}$ during a turn-on/turn-off cycle of an embodiment power system. At the instant when transistor 112 is turned on, inductor current $I_{(ind)}$ starts increasing from minimum peak current $I_{(peakMin)}$ value. Inductor current $I_{(ind)}$ increases until transistor 112 is turned off. At the instant when transistor 112 is turned off, inductor current $I_{(ind)}$ starts decreasing from maximum peak current $I_{(peakMax)}$ value. Inductor current $I_{(ind)}$ will decrease until transistor 112 is turned on again or until inductor current $I_{(ind)}$ reaches zero. The average inductor current $I_{(avg)}$ is given by $$I_{(avg)} = \frac{I_{(peakMin)} + I_{(peakMax)}}{2} \quad (1)$$

current ripple $I_{(rip)}$ is the peak-to-peak current of inductor current, and it is given by $$I_{(rip)} = I_{(peakMax)} - I_{(peakMin)} \quad (2)$$

and switching frequency $f_{(sw)}$ is given by $$f_{(sw)} = \frac{1}{t_{(on)} + t_{(off)}} \quad (3)$$

Given the relationships between variables of interest, modifying one or more of them often results in changes in the others. For example, increasing maximum peak current $I_{(peakMax)}$ results on a higher average inductor current $I_{(avg)}$, a higher on-time $t_{(on)}$, a higher ripple $I_{(rip)}$, and a lower frequency $f_{(sw)}$. Decreasing maximum peak current $I_{(peakMax)}$ has the opposite effect. Similarly, decreasing minimum peak current $I_{(peakMin)}$ results on a lower average inductor current $I_{(avg)}$, a higher on-time $t_{(on)}$, a higher ripple $I_{(rip)}$, and a lower frequency. Increasing minimum peak current $I_{(peakMin)}$ has the opposite effect. Increasing off-time $t_{(off)}$ results in a lower minimum peak current $I_{(peakMin)}$, a lower average inductor current $I_{(avg)}$, a higher ripple $I_{(rip)}$, and a lower frequency $f_{(sw)}$. Decreasing off-time $t_{(off)}$ has the opposite effect. In the same way, increasing on-time $t_{(on)}$ results in a higher maximum peak current $I_{(peakMax)}$, a higher average inductor current $I_{(avg)}$, a higher ripple $I_{(rip)}$, and a lower frequency $f_{(sw)}$. Decreasing on-time $t_{(on)}$ has the opposite effect. Controlling some of the parameters of inductor current $I_{(ind)}$, has been done by monitoring inductor current $I_{(ind)}$ directly, and using topologies such as the hysteric buck converter.

Modifying more than one variable at the same time may achieve interesting and desirable results. For example, it is possible to decrease maximum peak current $I_{(peakMax)}$ and increase minimum peak current $I_{(peakMin)}$ such that average inductor current $I_{(avg)}$ remains constant. Such modification would result in lower current ripple $I_{(rip)}$ and higher switching frequency $f_{(sw)}$.

In embodiments of the present invention, inductor current $I_{(ind)}$ is monitored by measuring current $I_{(CS)}$ during on-time $t_{(on)}$ when transistor 112 is on. In such embodiments, maximum peak current $I_{(peakMax)}$ is controlled by enforcing an upper current level $I_{(OCP)}$, and off-time $t_{(off)}$ is estimated such that a desired current ripple $I_{(rip)}$ is achieved around or above a desired switching frequency $f_{(sw)}$. By updating upper current level $I_{(OCP)}$ and off-time $t_{(off)}$ concurrently, a smooth average inductor current $I_{(avg)}$ curve can be achieved.

Figure 3A:
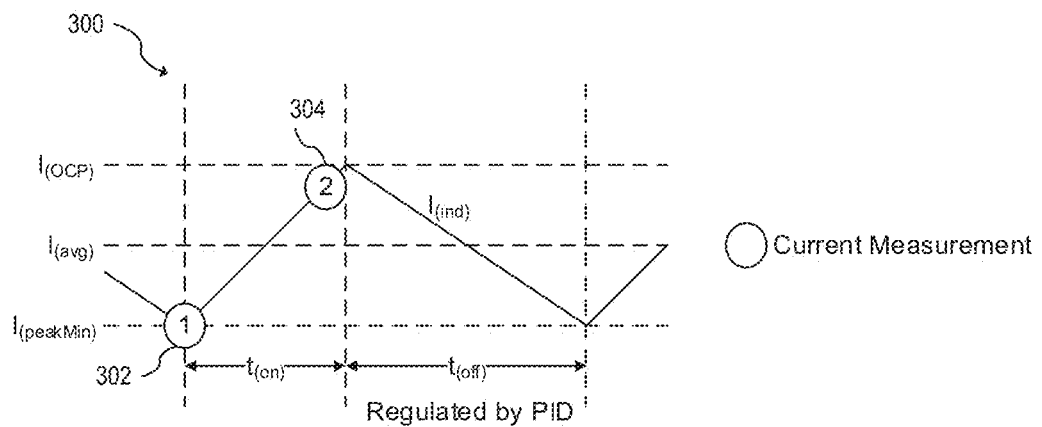
FIGS. 3a and 3b show current waveforms 300 and 320 of an inductor current $I_{(ind)}$ during a turn-on/turn-off cycle, depicting turn-on and turn-off times, as well as the times where current measurements are taken.
Figure 3B:
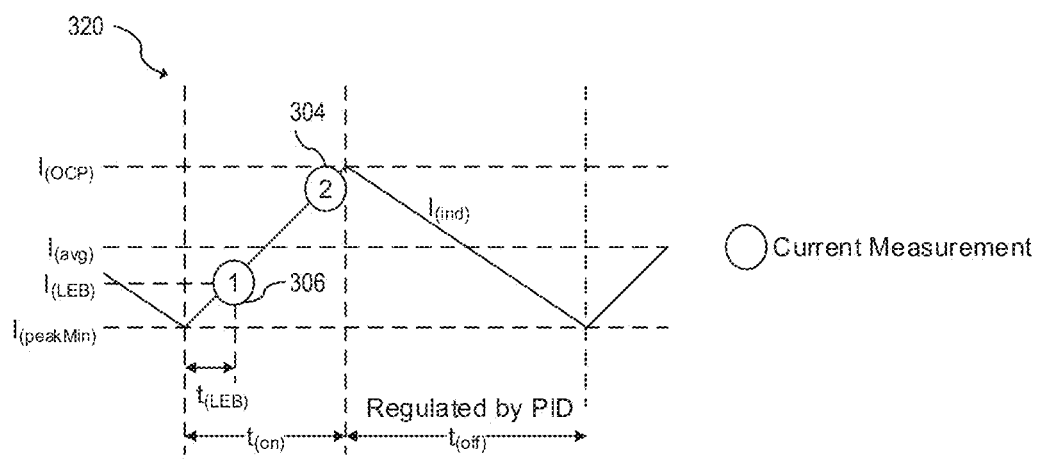

FIGS. 3a and 3b show current waveforms 300 and 320 of an inductor current $I_{(ind)}$ during a turn-on/turn-off cycle, depicting turn-on and turn-off times, as well as the times where current measurements are taken. As shown in FIG. 3a, minimum peak current $I_{(peakMin)}$ value may be determined by measuring or sampling current $I_{(CS)}$ at time 302, which occurs after transistor 112 has been turned on. Similarly, maximum peak current $I_{(peakMax)}$ value may be determined by measuring or sampling current $I_{(CS)}$ at time 304, which occurs before transistor 112 is turned off. In some embodiments, where a comparator is used to turn off transistor 112, the comparator threshold value, which is set to upper current level $I_{(OCP)}$, may be used as maximum peak current $I_{(peakMax)}$ instead of measuring or sampling current $I_{(CS)}$.

In some embodiments, both minimum peak current $I_{(peakMin)}$ and maximum peak current $I_{(peakMax)}$ may be determined by collecting two or more samples and using numerical techniques known in the art to extrapolate the value at the instant transistor 112 was turned on for minimum peak current $I_{(peakMin)}$ value and at the instant transistor 112 was turned off for maximum peak current $I_{(peakMax)}$ value. In embodiments in which inductor current $I_{(ind)}$ is not observable by current sensor 110 when transistor 112 is off, such as in LED lighting system 100, transistor 112 off-time $t_{(off)}$ may be determined based on observable parameters. In embodiments in which time 302 occurs long after transistor 112 is turned on or time 304 occurs long before transistor 112 is turned off, minimum peak current $I_{(peakMin)}$ value and maximum peak current $I_{(peakMax)}$ value may need to be adjusted to compensate for such delay. For example, FIG. 3b shows waveform 320 where current $I_{(CS)}$ is sampled at time 306, which occurs after leading edge blanking (LEB) time $t_{(LEB)}$. In this case, minimum peak current $I_{(peakMin)}$ may be determined according to $$I_{(peakMin)} = I_{(LEB)} - \frac{I_{(peakMax)} - I_{(LEB)}}{t_{(on)} - t_{(LEB)}} \cdot t_{(LEB)} \quad (4)$$

where $t_{(on)}$ is the time where transistor 112 is on, $t_{(LEB)}$, and $I_{(LEB)}$ is the current measured at time $t_{(LEB)}$.

Figure 4A:
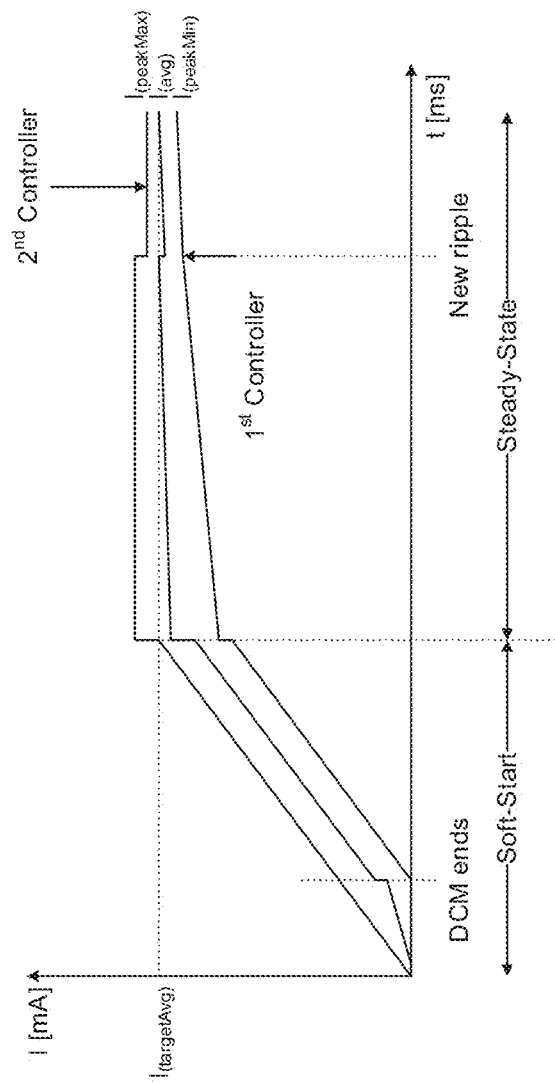
FIGS. 4a-4b show the behavior of conventional control loops for current ripple $I_{(rip)}$ and average inductor current $I_{(avg)}$ during a soft-start state and a steady-state.
Figure 4B:
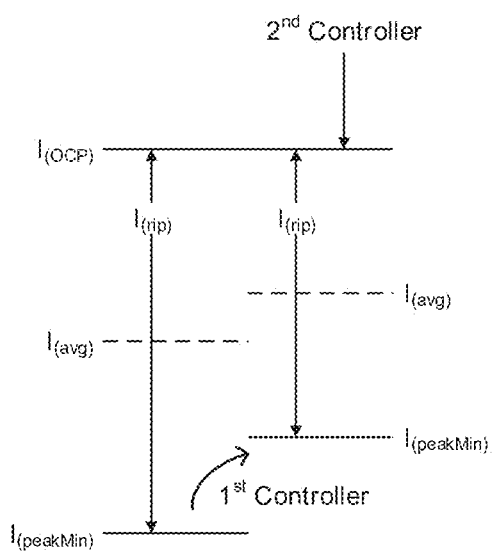

One way in which LED controllers have been implemented in the past is by using two independent control loops: a first control loop for regulating average inductor current $I_{(avg)}$ to a target average inductor current $I_{(targetAvg)}$ and a second control loop for regulating switching frequency $f_{(sw)}$. FIG. 4a shows the behavior of the first and second control loop and its effect on current ripple $I_{(rip)}$ and average inductor current $I_{(avg)}$ during the soft-start state and the steady-state. FIG. 4b shows the behavior of the first and second control loop and its effects focusing on the steady-state. As can be seen from FIGS. 4a-4b, the first control loop regulates average inductor current $I_{(avg)}$ by updating off-time $t_{(off)}$ and operates at a higher frequency than then second control loop. The second control loop regulates switching frequency $f_{(sw)}$ by updating upper current level $I_{(OCP)}$, and thus, also controlling current ripple $I_{(rip)}$. However, in this scheme, the second control loop also influences average inductor current $I_{(avg)}$. In some cases, interaction between the two loops is addressed to avoid instabilities. For example, the second control loop may be disabled during the soft-start state. Without monitoring output voltage $V_{(out)}$, current ripple $I_{(rip)}$ is unknown at the instant when the second control loop is activated. If output voltage $V_{(out)}$ is not being monitored, the second control loop may need to select an initial switching frequency $f_{(sw)}$ value that may be far from the target switching frequency $f_{(targetSw)}$ to ensure convergence is possible, but potentially impacting the transient performance. When the second control loop is active and updates upper current level $I_{(OCP)}$, the first control loop reacts to try to converge to target average inductor current $I_{(targetAvg)}$, creating an average inductor current $I_{(avg)}$ curve that looks piecewise linear, which may result in flicker.

Figure 5A:
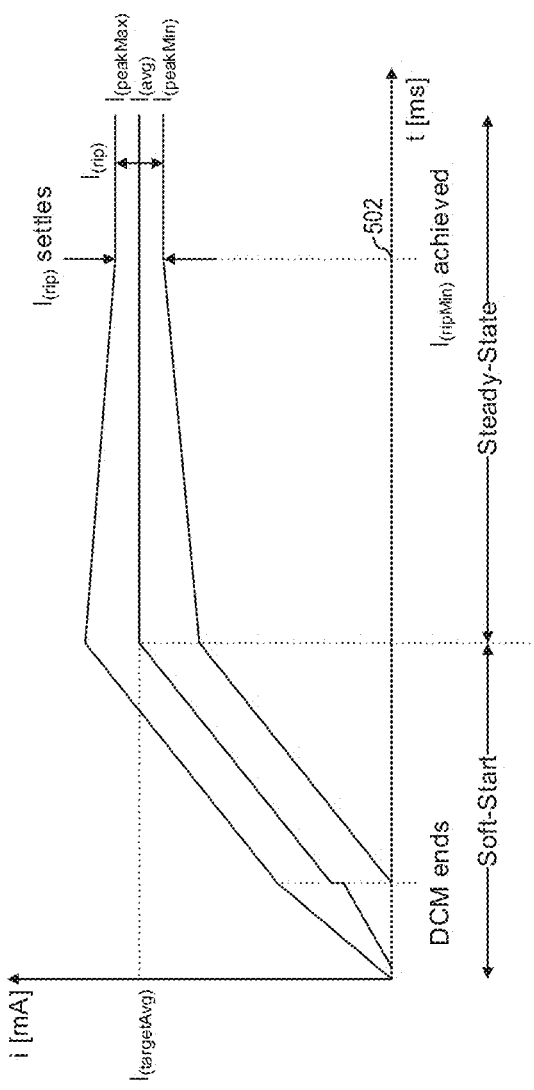
FIGS. 5a-5b show the behavior of a control loop of an embodiment of the present invention for controlling current ripple $I_{(rip)}$ and average inductor current $I_{(avg)}$ during soft-start state and steady-state.
Figure 5B:
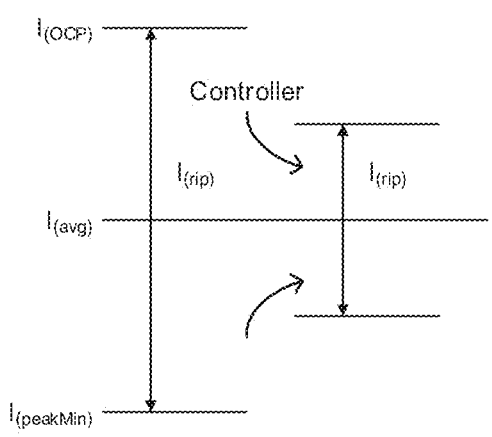

FIGS. 5a-5b illustrate how, in some embodiments of the present invention, average inductor current $I_{(avg)}$ and current ripple $I_{(rip)}$ are regulated by simultaneously and synchronously updating upper current level $I_{(OCP)}$ and off-time $t_{(off)}$, resulting in a smooth average inductor current $I_{(avg)}$ curve. FIG. 5a shows the behavior of average inductor current $I_{(avg)}$, and its lower and upper limit during the soft-start state and the steady-state. FIG. 5a further shows the time when current ripple $I_{(rip)}$ settles. For example, in some embodiments current ripple $I_{(rip)}$ does not substantially change beginning at time 502. FIG. 5b shows the behavior of average inductor current $I_{(avg)}$, and its lower and upper limit during focusing on the steady-state. Such an implementation allows for the use of a single controller, including, but not limited to proportional-integral-derivative (PID) controller, which can be employed during the soft-start state, avoiding control loop interactions and, thus, reducing system complexity and computational expense. Other controllers or compensators known in the art may be used. Since current may be ensured as soon as the system is out of discontinuous conduction mode (DCM), the system quickly reaches steady-state.

Figure 6:
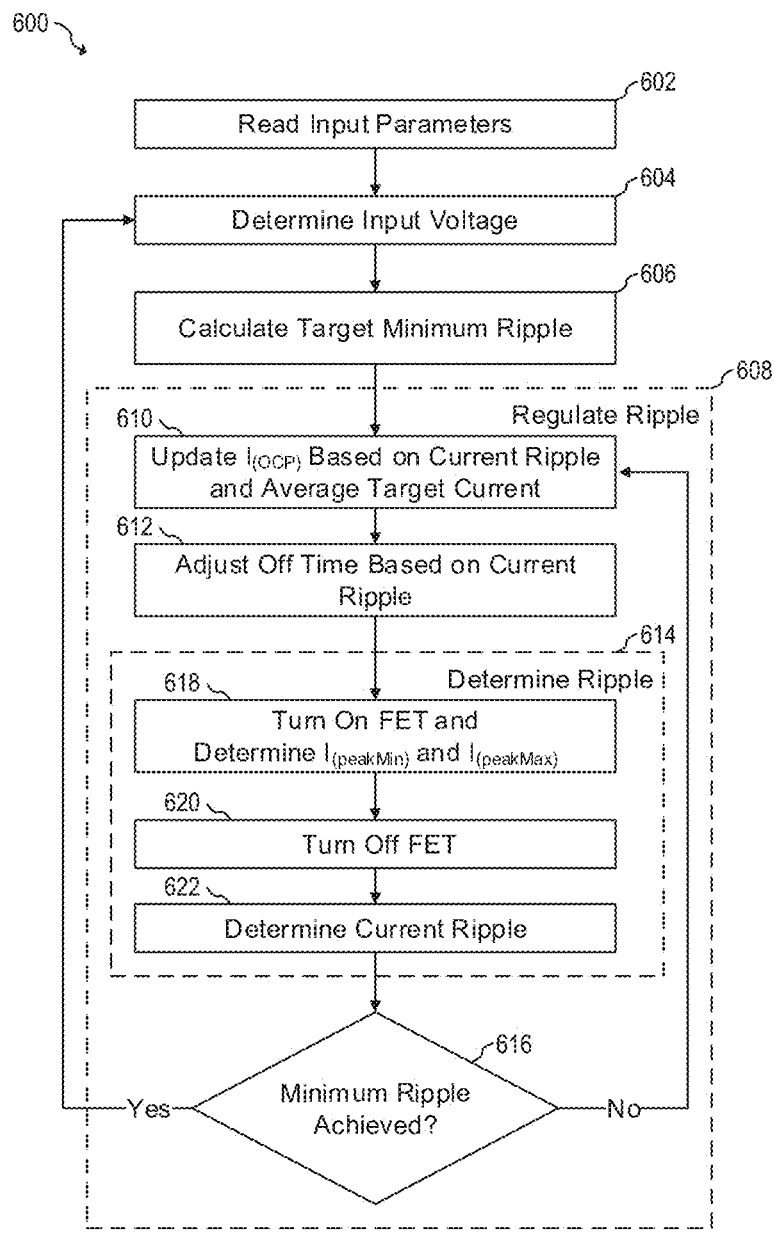
FIG. 6 illustrates a flow chart of an embodiment method for controlling an inductor current $I_{(ind)}$ to achieve a target average inductor current $I_{(targetAvg)}$ with a desired minimum current ripple $I_{(ripMin)}$ and above a target switching frequency $f_{(targetSw)}$.

FIG. 6 illustrates a flow chart of an embodiment method 600 for controlling an inductor current $I_{(ind)}$ to achieve a target average inductor current $I_{(targetAvg)}$ with a desired minimum current ripple $I_{(ripMin)}$ and above a target switching frequency $f_{(targetSw)}$. In step 602, input parameters are read. Input parameters may include inductance L, limits on system duty cycle D, and target switching frequency $f_{(targetSw)}$, where system duty cycle D is given according to $$D = \frac{V_{(LED)}}{V_{(in)}} \quad (5)$$

where $V_{(LED)}$ is the voltage across LED load 120. Equation 5 may incorporate other components from other sources of voltage drops, and system parasitics.

In some embodiments, target average inductor current $I_{(targetAvg)}$ may be a parameter read in step 602. Step 602 may be done, for example, by controller 102 reading internal memory, controller 102 communicating with a peripheral device, or any other method known in the art. In step 604 input voltage $V_{(in)}$ is determined. $V_{(in)}$ may be determined by direct measurement, such as by sampling it with an ADC or any other method known in the art. $V_{(in)}$ may also be determined by assuming that it will not vary and, thus, eliminating the need for measuring it.

The determination of target minimum current ripple $I_{(ripMin)}$ is performed in step 606. Target minimum current ripple $I_{(ripMin)}$, which is used in some embodiments of the present invention, represents a lower bound for current ripple $I_{(rip)}$, which is ensured by design. Other embodiments may, instead, may ensure that a target ripple is achieved. The general expression for target ripple $I_{(targetRip)}$ is given according to $$I_{(targetRip)} = \alpha \cdot \frac{D \cdot (1-D)}{L \cdot f_{(targetSw)}} \cdot V_{(in)} \quad (6)$$

where $\alpha$ is a constant, which may be between 0 and 1, used to scale down the target ripple $I_{(targetRip)}$ to compensate for temperature effects and inductor tolerance. In some embodiments, target ripple $I_{(targetRip)}$ may be determined by Equation 6. Alternatively, target ripple $I_{(targetRip)}$ may be given by an external peripheral, signal, or some other method known in the art. Determining target minimum ripple $I_{(ripMin)}$ may be performed by selecting the system duty cycle D that would generate the minimum ripple using, for example, Equation 6. For example, in a system where the system duty cycle D is between 0.2 and 0.9, inductance value L is 600 μH, and target switching frequency $f_{(targetSw)}$ is 240 kHz, the target minimum ripple $I_{(ripMin)}$ is given according to $$I_{(ripMin)} = \alpha \cdot \frac{0.09}{L \cdot f_{(targetSw)}} \cdot V_{(in)} \quad (7)$$

$I_{(ripMin)}$ becomes the target ripple in regulation step 608.

The regulation step 608 includes step 610 for determining upper current level $I_{(OCP)}$, step 612 for determining transistor 112 off-time $t_{(off)}$, step 614 for determining the current ripple $I_{(rip)}$, and step 616 for comparing current ripple $I_{(rip)}$ with target current ripple $I_{(targetRip)}$ and looping back to step 610 when target current ripple $I_{(targetRip)}$ is not achieved.

In step 610, upper current level $I_{(OCP)}$ may be determined according to $$I_{(OCP)} = I_{(targetAvg)} + \frac{I_{(rip)}}{2} \quad (8)$$

where target average inductor current $I_{(targetAvg)}$ may be, for example, a system constant read in step 604 or given by dimming signal 134. If current ripple $I_{(rip)}$ has not been determined, a default value may be used.

In step 612 transistor 112 off-time $t_{(off)}$ is determined based on current ripple $I_{(rip)}$. If current ripple $I_{(rip)}$ has not been determined, a default value may be used.

Step 614 includes step 618 for turning on transistor 112 and for determining minimum peak current $I_{(peakMin)}$ and maximum peak current $I_{(peakMax)}$, step 620 for turning off transistor 112, and step 622 for determining current ripple $I_{(rip)}$. Current ripple $I_{(rip)}$ may be determined according to $$I_{(rip)} = I_{(peakMax)} - I_{(peakMin)} \quad (9).$$

In some embodiments the current ripple $I_{(rip)}$ determination may be performed every time transistor 112 is turned on or off. Alternatively, the determination of current ripple $I_{(rip)}$ may not be performed every cycle and, instead, may skip one or more cycles. In other embodiments, the determination of current ripple $I_{(rip)}$ may come entirely from a mathematical model or other modeling techniques know in the art. The determination of current ripple $I_{(rip)}$ may use measurement and sampling techniques, modeling techniques, or a combination thereof.

In step 616 current ripple $I_{(rip)}$ is compared with target current ripple $I_{(targetRip)}$ to obtain current ripple error $I_{(ripError)}$, as shown in Equation below $$I_{(ripError)} = I_{(targetRip)} - I_{(rip)} \quad (10)$$

where $$I_{(ripError)} \rightarrow 0 \quad (11).$$

If $I_{(ripError)}$ is higher than a predetermined value, steps 610, 612 and 614 are executed again, otherwise, step 604 is executed. In some embodiments step 610 is executed concurrently with step 612. In other embodiments, step 610 is executed sequentially with step 612 with step 610 happening either before or after step 612. Steps 604 and 606 may occasionally be skipped.

An advantage of looping back to execute step 604 and 606 is that it enables embodiment method to adapt to input voltage $V_{(in)}$ changes. In embodiments where input voltage $V_{(in)}$ is stable, steps 604 and 606 may be omitted.

Figure 7:
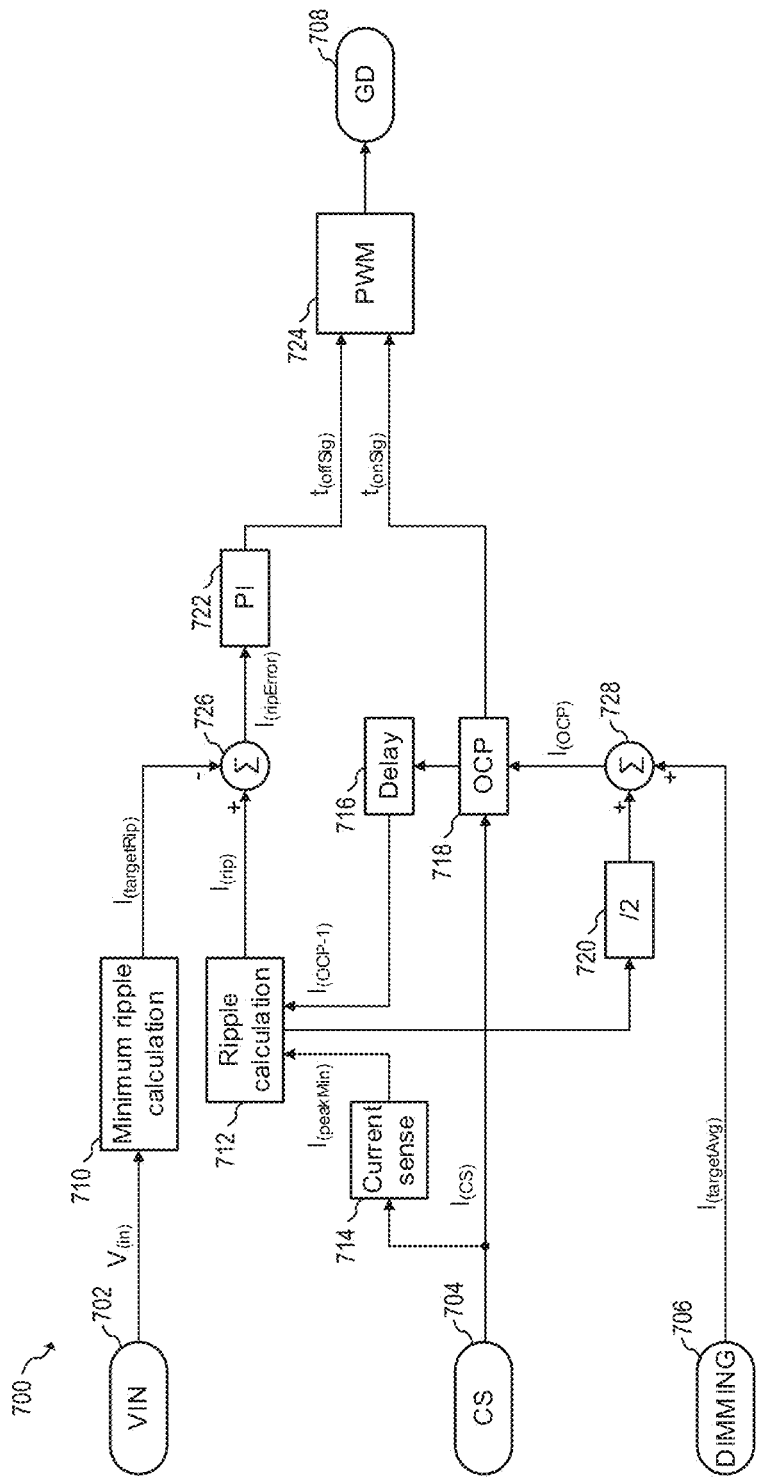
FIG. 7 illustrates a control diagram of an embodiment of the present invention for driving output signal 708 to control an inductor current $I_{(ind)}$ to achieve a target average inductor current $I_{(targetAvg)}$ with a desired minimum current ripple $I_{(ripMin)}$ and above a target switching frequency $f_{(targetSw)}$.

FIG. 7 illustrates a control diagram of embodiment 700 for driving output signal 708 to control an inductor current $I_{(ind)}$ to achieve a target average inductor current $I_{(targetAvg)}$ with a desired minimum current ripple $I_{(ripMin)}$ and above a target switching frequency $f_{(targetSw)}$ based on input voltage 702, input current 704 and dimming signal 706. PWM block 724 generates output signal 708, which turns on and off transistor 112. Output signal 708 may be a pulse width modulated signal where switching frequency $f_{(sw)}$ and duty cycle are based on signals $t_{(onSig)}$ and $t_{(offSig)}$. Signal $t_{(onSig)}$ is determined by over-current protection (OCP) block 718, which sets the upper current level $I_{(OCP)}$. Upper current level $I_{(OCP)}$ may be determined based on ripple calculation blocks 712, divider block 720, addition block 728 and dimming signal 706 following, for example, Equation 8. Dimming signal 706 determines target average inductor current $I_{(targetAvg)}$ based, for example, on an external PWM signal. Input current 704 determines current $I_{(CS)}$ based on, for example, sensing a voltage across a resistor, or any other method for sensing current known in the art. Current sense block 714 determines minimum peak current $I_{(peakMin)}$ based, for example, on a measurement taken at the instant transistor 112 turns on. Ripple calculation block 712 determines current ripple $I_{(rip)}$ based on minimum peak current $I_{(peakMin)}$ and a delayed sample of delayed upper current level $I_{(OCP-1)}$ following, for example, Equation 9, where maximum peak current $I_{(peakMax)}$ is equal to $I_{(OCP-1)}$. Minimum ripple calculation block 710 determines the minimum current ripple $I_{(ripMin)}$ based on, for example, input voltage $V_{(in)}$, a target switching frequency $f_{(targetSw)}$, inductance L, and a system duty cycle D following Equation 6. Constant α may be adjusted accordingly. Proportional-integral (PI) controller block 722 determines off-time $t_{(offSig)}$ based on current ripple $I_{(rip)}$ and target current ripple $I_{(targetRip)}$. Alternatively, other dynamic control blocks besides a PI controller, such as a PID controller, may be used.

Figure 8:
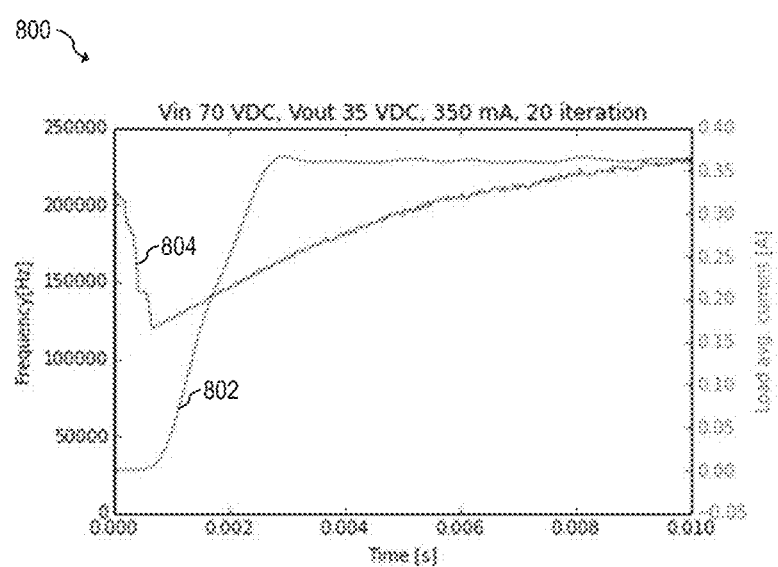
FIGS. 8 and 9 show simulation results of an embodiment of the present invention.
Figure 9:
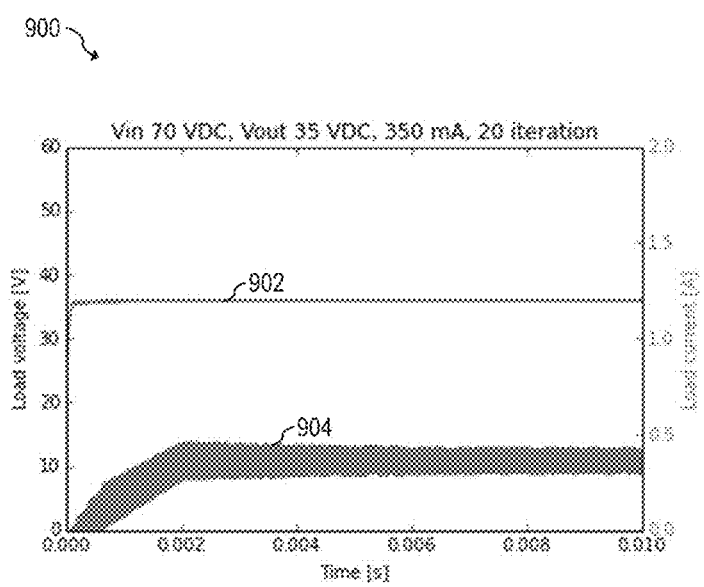

FIGS. 8 and 9 show simulation results of an embodiment of the present invention illustrating how average inductor current curve 802, switching frequency curve 804, load current curve 904 and load voltage curve 902 transition during soft-start state and steady-state. As shown by average inductor current curve 802, average inductor current $I_{(avg)}$ transitions smoothly from 0 mA to 350 mA, which is the target average inductor current $I_{(targetAvg)}$ in this case. Other embodiments may use other target average inductor current $I_{(targetAvg)}$. Switching frequency $f_{(sw)}$ starts at a default value, and settles above target switching frequency $f_{(targetSw)}$, which in this case is 240 kHz. Other embodiments may use other target switching frequency $f_{(targetSw)}$. Load voltage curve 902 shows how load voltage $V_{(LED)}$ transitions quickly to a constant voltage. Load current curve 904 shows load current $I_{(LED)}$ over time without filtering. The difference between the upper level and lower level of load current curve 904 is current ripple $I_{(rip)}$, which converges in a symmetrical way to a minimum current ripple $I_{(ripMin)}$. In some embodiments, minimum current ripple $I_{(ripMin)}$ may not be achieved.

Figure 10A:
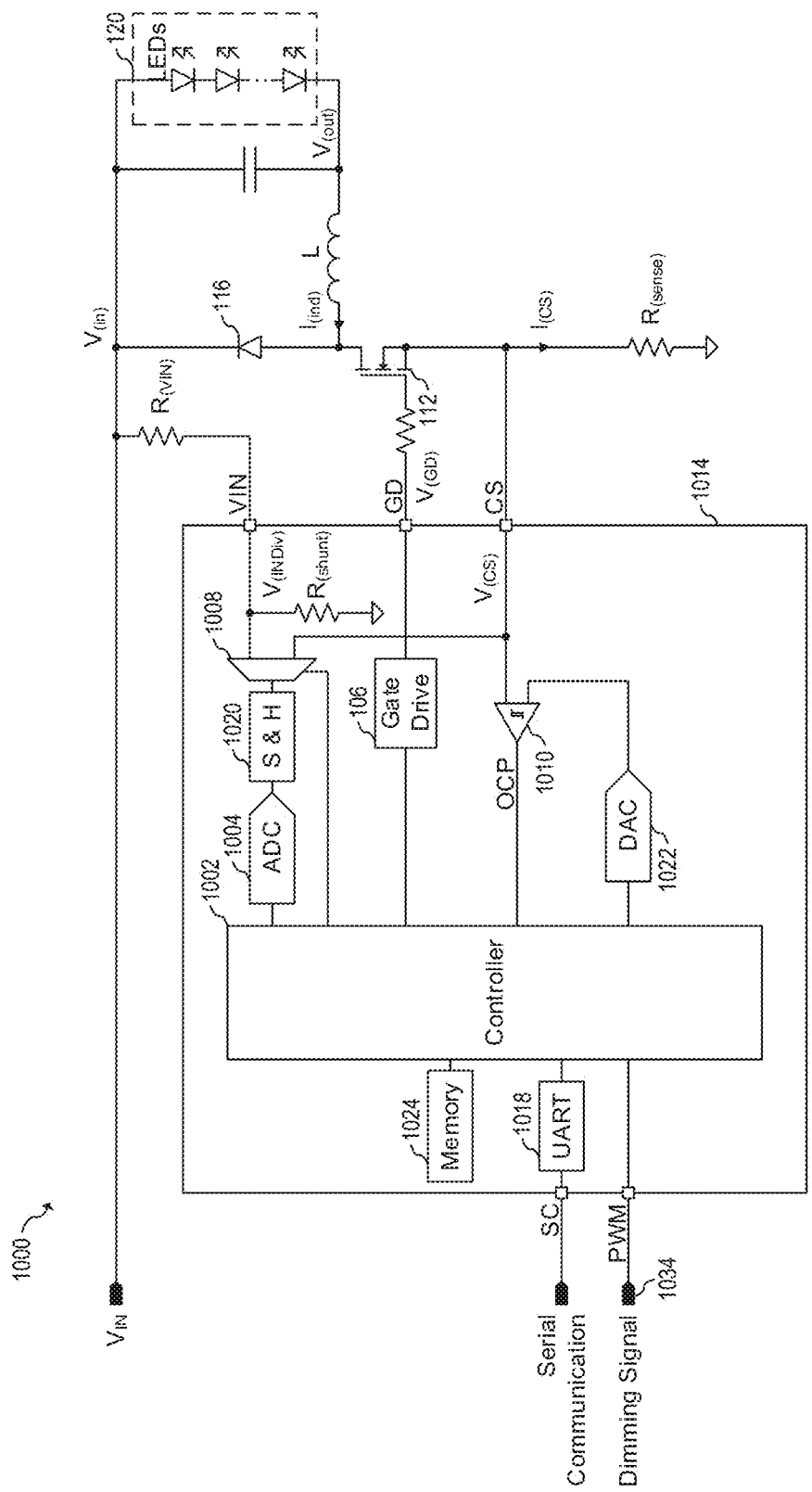
FIG. 10a illustrates a schematic of embodiment LED lighting system 1000.

FIG. 10a illustrates a schematic of embodiment LED lighting system 1000. Essentially, LED lighting system 1000 includes a switch-mode buck converter including power supply IC 1014 that supplies current to LED load 120, which includes one or more LED devices. LED lighting system 1000 includes controller 1002, gate drive block 106, multiplexer (MUX) 1008, ADC block 1004, sample and hold (S&A) block 1020, OCP comparator 1010, memory block 1024, UART block 1018, digital to analog converter (DAC) block 1022, transistor 112, resistor $R_{(shunt)}$, resistor $R_{(VIN)}$, resistor $R_{(sense)}$, inductor L, diode 116, and LED load 120. In this embodiment, controller 1002, gate drive block 106, MUX 1008, ADC block 1004, S&A block 1020, OCP comparator 1010, memory block 1024, UART block 1018, digital to analog converter (DAC) block 1022, resistor $R_{(shunt)}$, are inside IC 1014. In other embodiments, a different set of components may be integrated inside IC 1014, or the solution may be implemented using only discrete components.

Controller 1002 is capable, for example, of performing mathematical operations, as well interacting with external components. Controller 1002 may be custom designed, or, alternatively, may be a general purpose controller, a processor, or any similar component known in the art.

Gate drive block 106 is a circuit coupled to a gate terminal of transistor 112 that is capable of applying voltage $V_{(GD)}$ to turn transistor 112 on or off depending on voltage $V_{(GD)}$ value. Gate drive block 106 may be inside IC 1014 or, alternatively, may be a component external to IC 1014.

ADC block 1004 and S&A block 1020 are used to sample a voltage at the input of S&A block 1020, and to communicate it to controller 1002.

Resistor $R_{(shunt)}$ and resistor $R_{(VIN)}$ are used to divide voltage $V_{(in)}$ to voltage $V_{(INDiv)}$ so that it is sampled by ADC block 1004. $R_{(shunt)} + R_{(VIN)}$ may be selected sufficiently high such that current consumption is minimized.

Determining the value of input voltage $V_{(in)}$ has many advantages. For example, it can be used to implement embodiments of the present invention by using Equations 6 and 7. The value of input voltage $V_{(in)}$ may also be used to determine output voltage $V_{(out)}$, since a voltage drop associated with LED load 120 is approximately constant. Such an approach may eliminate the need for measuring or sensing output voltage $V_{(out)}$ directly, thereby eliminating the need for additional pins for sensing output voltage $V_{(out)}$ in some embodiments.

MUX 1008 is used to select which voltage is to be sampled by ADC block 1004 between voltage $V_{(CS)}$ or voltage $V_{(INDiv)}$. The MUX selection may be controlled by controller 1002. ADC block 1004 may sample continuously voltage $V_{(CS)}$, voltage $V_{(INDiv)}$ or a combinations thereof. Alternatively, ADC block 1004 may selectively sample voltage $V_{(CS)}$ and voltage $V_{(INDiv)}$ on an as needed basis.

Comparator 1010 and DAC block 1022 are used to detect when current $I_{(CS)}$ reaches an upper current level $I_{(OCP)}$. Comparator 1010 transitions between states (high to low or low to high) depending on voltage $V_{(CS)}$ and a voltage generated by DAC block 1022. Comparator 1010 may be a Schmitt Trigger or any other suitable comparator known in the art. Upper current level $I_{(OCP)}$ is set by DAC block 1022 and depends on the value of resistor $R_{(sense)}$.

A description of the general operation of LED lighting system 1000 is as follows. When transistor 112 is on, voltage $V_{(ind)}$ is pulled down. Since voltage $V_{(out)}$ is pulled up by voltage $V_{(in)}$ through LED load 120, current $I_{(ind)}$ increases according to a voltage difference given by $V_{(out)} - V_{(ind)}$. Current $I_{(CS)}$, which is approximately equal to current $I_{(ind)}$ while transistor 112 is on, is monitored by using ADC 1004 and S&A 1020. Comparator 1010 is used to signal controller 1002 to turn off transistor 112 when current $I_{(CS)}$ reaches upper current level $I_{(OCP)}$. When transistor 112 is turned off, current $I_{(ind)}$ causes voltage $V_{(ind)}$ to increase to voltage $V_{(in)} + V_{(D)}$, where $V_{(D)}$ is the forward voltage of diode 116. At that point, current $I_{(ind)}$ flows through diode 116 until inductor current $I_{(ind)}$ reaches zero or transistor 112 is turned on again. Turning on transistor 112 again causes the process to repeat. The process for turning on and off transistor 112 may be done by PWM techniques, PFM techniques, or any other method known in the art.

Dimming signal 1034 establishes a desired average amplitude for current $I_{(LED)}$, thus, controlling the brightness of LED load 120. Dimming signal 1034 may be a PWM signal used to adjust the intensity of light produced by LED load 120. Controller 1002 may associate a particular duty cycle of the PWM signal to a particular value of target average inductor current $I_{(targetAvg)}$ and update target average inductor current $I_{(targetAvg)}$ in real time. Alternatively, controller 1002 may determine the desired target average inductor current $I_{(targetAvg)}$ in real time based on information communicated by an external device using protocols known in the art, such as by using UART block 1018, or by other protocols such as I²S, I²C, PCM, MIPI/RFFE, DALI, KNX, or any other serial or parallel interface. Other embodiments may use analog dimming to control the brightness of LED load 120. For example, a mapping where 0 V represents LED load 120 is off and 10 V represents LED load 120 is at full brightness could be used. A range between 1 V to 10 V could also be used. Other dimming protocols or techniques known in the art could also be used. In other embodiments, target average inductor current $I_{(targetAvg)}$ may be stored in memory 1024, as a result of the digital communication, or as a factory default. By this approach, controller 1002 can regulate current $I_{(ind)}$ to a target average value $I_{(targetAvg)}$ given by dimming signal 1034.

Figure 10B:
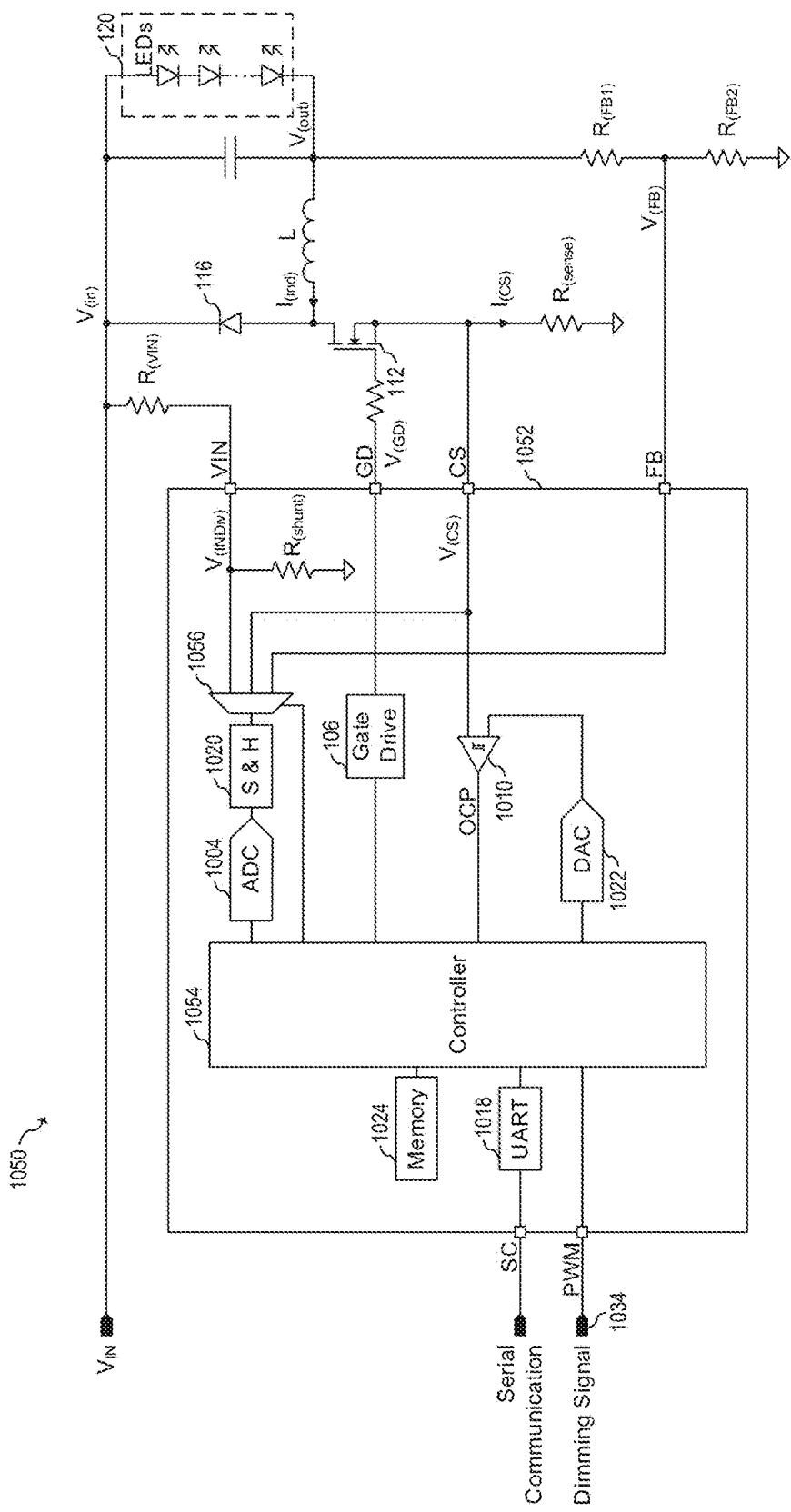
FIG. 10b illustrates a schematic of embodiment LED lighting system 1050 where output voltage $V_{(out)}$ is directly measured.

FIG. 10b illustrates a schematic of embodiment LED lighting system 1050 where output voltage $V_{(out)}$ is directly measured. LED lighting system 1050 includes power supply IC 1052 that supplies current to LED load 120, which includes one or more LED devices. LED lighting system 1050 includes controller 1054, gate drive block 106, multiplexer (MUX) 1056, ADC block 1004, sample and hold (S&A) block 1020, OCP comparator 1010, memory block 1024, UART block 1018, DAC block 1022, transistor 112, resistor $R_{(shunt)}$, resistor $R_{(VIN)}$, resistor $R_{(sense)}$, inductor L, diode 116, resistors $R_{(FB1)}$ and $R_{(FB2)}$, and LED load 120. In this embodiment, controller 1054, gate drive block 106, MUX 1056, ADC block 1004, S&A block 1020, OCP comparator 1010, memory block 1024, UART block 1018, DAC block 1022, resistor $R_{(shunt)}$, are inside IC 1052. In other embodiments, a different set of components may be integrated inside IC 1052, or the solution may be implemented using only discrete components.

Controller 1054 is capable, for example, of performing mathematical operations, as well interacting with external components. Controller 1002 may be custom designed, or, alternatively, may be a general purpose controller, a processor, or any similar component known in the art.

LED lighting system 1050 further includes terminal FB for sensing output voltage $V_{(out)}$. Additional resistors $R_{(FB1)}$ and $R_{(FB2)}$ may be required to create a voltage divider for sensing purposes. Feedback voltage $V_{(FB)}$ may be sampled using ADC block 1004 and S&A block 1020.

MUX 1056 is used to select which voltage is to be sampled by ADC block 1004 between voltage $V_{(CS)}$, voltage $V_{(INDiv)}$, or feedback voltage $V_{(FB)}$. The MUX selection may be controlled by controller 1054. ADC block 1004 may sample continuously voltage $V_{(CS)}$, voltage $V_{(INDiv)}$, feedback voltage $V_{(FB)}$, or a combinations thereof. Alternatively, ADC block 1004 may selectively sample voltage $V_{(CS)}$, voltage $V_{(INDiv)}$, and feedback voltage $V_{(FB)}$ on an as needed basis.

Since output voltage $V_{(out)}$ is being measured directly, an embodiment circuit may, instead of measuring input voltage $V_{(in)}$, determine input voltage $V_{(in)}$ based on output voltage $V_{(out)}$, for example, according to $$V_{(in)} = V_{(out)} + V_{(LED)} \tag{12}$$

LED lighting system 1050 is, otherwise, similar to LED lighting system 1000, and may use similar methods, and equations with appropriate modifications. For example, V(in) as obtained by Equation 12, may be used in the control diagram of embodiment 700 to practice this invention.

Figure 11:
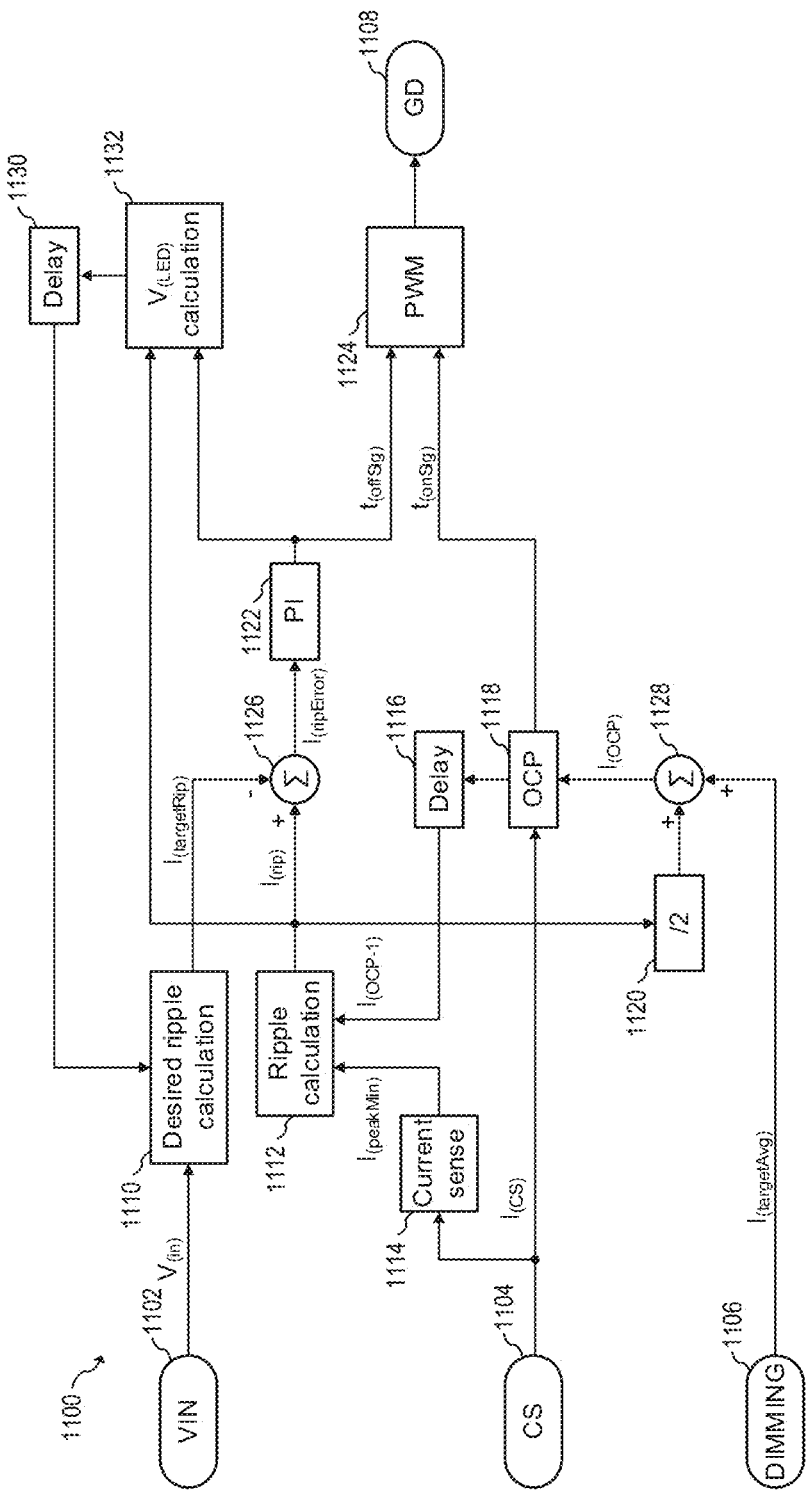
FIG. 11 illustrates a control diagram of embodiment for driving an output signal to control an inductor current $I_{(ind)}$ to achieve a target average inductor current $I_{(targetAvg)}$ with a desired minimum current ripple $I_{(ripMin)}$ and around a target switching frequency $f_{(targetSw)}$.

An advantage of the present invention is that, with little modification, as shown in FIG. 11, the system can achieve fixed switching frequency $f_{(sw)}$ operations by targeting a desired ripple instead of ensuring a minimum ripple. A fixed switching frequency $f_{(sw)}$ operation may be desirable to ensure avoiding too high operating frequencies to decrease switching losses and chip power consumption.

FIG. 11 illustrates a control diagram of embodiment 1100 for driving output signal 1108 to control an inductor current $I_{(ind)}$ to achieve a target average inductor current $I_{(targetAvg)}$ with a desired target switching frequency $f_{(targetSw)}$ based on input voltage 1102, input current 1104 and dimming signal 1106. PWM block 1124 generates output signal 1108, which turns on and off transistor 112. Output signal 1108 may be a pulse width modulation type of signal where switching frequency $f_{(sw)}$ and duty cycle are based on signals $t_{(onSig)}$ and $t_{(offSig)}$. Signal $t_{(onSig)}$ is determined by over-current protection (OCP) block 1118, which sets the upper current level $I_{(OCP)}$. Upper current level $I_{(OCP)}$ may be determined based on $V_{(LED)}$ calculation blocks 1132, divider block 1120, addition block 1128 and dimming signal 1106. Dimming signal 1106 determines target average inductor current $I_{(targetAvg)}$ based, for example, on an external PWM signal. Input current 1104 determines current $I_{(CS)}$ based on, for example, sensing a voltage across a resistor, or any other method for sensing current known in the art. Current sense block 1114 determines minimum peak current $I_{(peakMin)}$ based, for example, on a measurement taken at the instant transistor 112 turns on. Ripple calculation block 1112 determines current ripple $I_{(rip)}$ based on minimum peak current $I_{(peakMin)}$ and a delayed sample of delayed upper current level $I_{(OCP-1)}$ following, for example, Equation 9, where maximum peak current $I_{(peakMax)}$ is equal to $I_{(OCP-1)}$. Desired ripple calculation block 1110 determines target current ripple $I_{(targetRip)}$ based, for example, on input voltage $V_{(in)}$, output voltage $V_{(out)}$, a target switching frequency $f_{(targetSw)}$, inductance L, and a system duty cycle D. Proportional-integral (PI) controller block 1122 determines off-time $t_{(offSig)}$ based on current ripple $I_{(rip)}$ and target current ripple $I_{(targetRip)}$. $V_{(LED)}$ calculation blocks 1132 determines load voltage $V_{(LED)}$, for example, according to Equation 12.

One general aspect includes a method of operating a switch-mode power supply, the method including: receiving a measurement of a first current of the switch-mode power supply; determining a ripple of the first current based on the received measurement of the first current; determining a maximum current threshold based on a target average current and the determined ripple of the first current; determining an off time of a switch based on a target current ripple and the determined ripple of the first current; turning off the switch when the first current reaches the maximum current threshold; and turning on the switch after the determined off time has elapsed after turning off the switch.

Implementations may include one or more of the following features. The method where the received measurement of the first current includes a first measurement of the first current taken during the turning on the switch. The method where the received measurement of the first current further includes a second measurement of the first current taken prior to turning off of the switch. The method further including receiving an input voltage of the switch-mode power supply. The method where the receiving an input voltage includes measuring the input voltage of the switch-mode power supply. The method further including determining a target minimum current ripple based on the received input voltage of the switch-mode power supply. The method where the determining the target minimum current ripple occurs after the determined ripple of the first current settles. The method further including: initializing an inductance value; initializing a frequency value; and initializing a system duty cycle value, where the determining the target minimum current ripple is further based on the inductance value, the frequency value, and the system duty cycle value. The method where the determining the target minimum current ripple is determined according to:

$$I_{(targetRip)} = \alpha \cdot \frac{D \cdot (1-D)}{L \cdot f_{(targetSw)}} \cdot V_{(in)}$$

where $I_{(targetRip)}$ is the target minimum current ripple, α is a constant between 0 and 1, D is the system duty cycle value, 1 is the inductance values and $f_{(targetSw)}$ is the frequency value. The method where the inductance value is initialized to 600 uH and the frequency value is initialized to 240 kHz. The method where the determining the maximum current threshold and the determining the off time of the switch happens concurrently. The method where the first current is at least one of a current through the switch and a current through an inductor coupled to the switch. The method further including receiving the target average current from a dimming signal. The method where the dimming signal includes a PWM signal. The method further including: receiving a target frequency of the switch-mode power supply; measuring an output voltage of the switch-mode power supply; and determining a target current ripple based on the measured output voltage of the switch-mode power supply and the received target frequency of the switch-mode power supply.

Another general aspect includes a switch-mode power supply including: a current measurement interface circuit; a gate drive interface circuit configured to be coupled to a control node of a switch of the switch-mode power supply; a controller coupled to the current measurement interface circuit and the gate drive interface circuit, the controller configured to receive a measurement of a first current of the switch-mode power supply via the current measurement interface circuit, determine a ripple of the first current based on the received measurement of the first current, determine a maximum current threshold based on a target average current and the determined ripple of the first current, determine an off time of the switch based on a target current ripple threshold and the determined ripple of the first current, turn off the switch via the gate drive interface circuit when the first current reaches the maximum current threshold; and turn on the switch after the determined off time of the switch has elapsed after turning off the switch.

Implementations may include one or more of the following features. The switch-mode power supply further including a current measurement circuit coupled between the current measurement interface circuit and a current path. The switch-mode power supply further including an input voltage measurement interface circuit, the controller further configured to receive a measurement of an input voltage of the switch-mode power supply. The switch-mode power supply where the controller is further configured to determine a target current ripple based on the received measurement of the input voltage of the switch-mode power supply. The switch-mode power supply further including a comparator, the comparator configured to detect when the first current reaches the maximum current threshold.

Yet another general aspect includes an LED lighting system including: a switch having a control node coupled to a power supply controller, an inductor coupled between a first output terminal of the switch and a first load terminal, a diode coupled between the first output terminal of the switch and a second load terminal, a current measurement circuit configured to measure a current in at least one of the switch and the inductor, and a power supply controller coupled to the switch and to the current measurement circuit configured to simultaneously control an average inductor current of the measured current and a ripple of the average inductor current.

Implementations may include one or more of the following features. The LED lighting system further including an LED coupled between the first load terminal and the second load terminal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a switch-mode power supply, the method comprising:
   receiving a measurement of a first current of the switch-mode power supply;
   determining a ripple of the first current based on the received measurement of the first current to produce a determined ripple of the first current;
   determining a maximum current threshold based on a target average current and the determined ripple of the first current;
   determining a target current ripple based on a target frequency;
   determining an off time of a switch based on the target current ripple and the determined ripple of the first current;
   turning off the switch when the first current reaches the maximum current threshold; and
turning on the switch after the determined off time has elapsed after turning off the switch.

2. The method of claim 1, wherein the received measurement of the first current comprises a first measurement of the first current taken during the turning on the switch.

3. The method of claim 2 wherein the received measurement of the first current further comprises a second measurement of the first current taken prior to turning off of the switch.

4. The method of claim 1, further comprising receiving an input voltage of the switch-mode power supply.

5. The method of claim 4, wherein the receiving an input voltage comprises measuring the input voltage of the switch-mode power supply.

6. The method of claim 4, wherein determining the target current ripple is further based on the received input voltage of the switch-mode power supply.

7. The method of claim 4, wherein the target current ripple is a target minimum current ripple, and wherein determining the target minimum current ripple occurs after the determined ripple of the first current settles.

8. The method of claim 1, further comprising:
   initializing an inductance value; and
   initializing a system duty cycle value,
   wherein determining the target current ripple is further based on the inductance value, and the system duty cycle value.

9. The method of claim 8, wherein determining the target current ripple is determined according to:

$$I_{(targetRip)} = \alpha \cdot \frac{D \cdot (1-D)}{L \cdot f_{(targetSw)}} \cdot V_{(in)},$$

wherein $I_{(targetRip)}$ is the target current ripple, $\alpha$ is a constant between 0 and 1, D is the system duty cycle value, L is the inductance value and $f_{(targetSw)}$ is the target frequency.

10. The method of claim 9, wherein the inductance value is initialized to 600 uH and the target frequency is initialized to 240 kHz.

11. The method of claim 1, wherein the determining the maximum current threshold and the determining the off time of the switch happens concurrently.

12. The method of claim 1, wherein the first current is at least one of a current through the switch and a current through an inductor coupled to the switch.

13. The method of claim 1, further comprising receiving the target average current from a dimming signal.

14. The method of claim 13, wherein the dimming signal comprises a PWM signal.

15. The method of claim 1, further comprising:
   receiving the target frequency; and
   measuring an output voltage of the switch-mode power supply wherein
   determining the target current ripple is further based on the measured output voltage of the switch-mode power supply.

16. A switch-mode power supply comprising:
   a current measurement interface circuit;
   a gate drive interface circuit configured to be coupled to a control node of a switch of the switch-mode power supply;
   a controller coupled to the current measurement interface circuit and the gate drive interface circuit, the controller configured to;
      receive a measurement of a first current of the switch-mode power supply via the current measurement interface circuit,
      determine a ripple of the first current based on the received measurement of the first current to produce a determined ripple of the first current,
      determine a maximum current threshold based on a target average current and the determined ripple of the first current,
      determine a target current ripple based on a target frequency,
      determine an off time of the switch based on the target current ripple and the determined ripple of the first current, turn off the switch via the gate drive interface circuit when the first current reaches the maximum current threshold; and turn on the switch after the determined off time of the switch has elapsed after turning off the switch.

17. The switch-mode power supply of claim 16, further comprising a current measurement circuit coupled between the current measurement interface circuit and a current path.

18. The switch-mode power supply of claim 16, further comprising an input voltage measurement interface circuit, the controller further configured to receive a measurement of an input voltage of the switch-mode power supply.

19. The switch-mode power supply of claim 18, wherein the controller is further configured to determine the target current ripple based on the received measurement of the input voltage of the switch-mode power supply.

20. The switch-mode power supply of claim 16, further comprising a comparator, the comparator configured to detect when the first current reaches the maximum current threshold.

21. An LED lighting system comprising:
   a switch having a control node coupled to a power supply controller;
   an inductor coupled between a first output terminal of the switch and a first load terminal;
   a diode coupled between the first output terminal of the switch and a second load terminal;

a current measurement circuit configured to measure an inductor current in at least one of the switch and the inductor; and a power supply controller coupled to the switch and to the current measurement circuit, the power supply controller configured to:

turn on and off the switch, determine a target current ripple based on a target frequency, and while switching, simultaneously control an average inductor current of the inductor current and an inductor current ripple by updating concurrently an upper current limit of the inductor current and an off time of the switch based on the target current ripple.

22. The LED lighting system of claim 21, further comprising an LED coupled between the first load terminal and the second load terminal.

23. The LED lighting system of claim 21, wherein the power supply controller is further configured to:

receive a measurement of the inductor current from the current measurement circuit to produce a received measurement of the inductor current;

determine the inductor current ripple based on the received measurement of the inductor current to produce a determined inductor current ripple;

determine the upper current limit based on a target average current and the determined inductor current ripple;

determine the off time of the switch based on the target current ripple and the determined inductor current ripple to produce a determined off time of the switch;

turn off the switch when the inductor current reaches a maximum current threshold; and turn on the switch after the determined off time of the switch has elapsed after turning off the switch.

* * * * *